No. 851,648. PATENTED APR. 30, 1907.
J. F. BUTTERFIELD.
ATTACHMENT FOR DOUBLETREES.
APPLICATION FILED APR. 26, 1906.
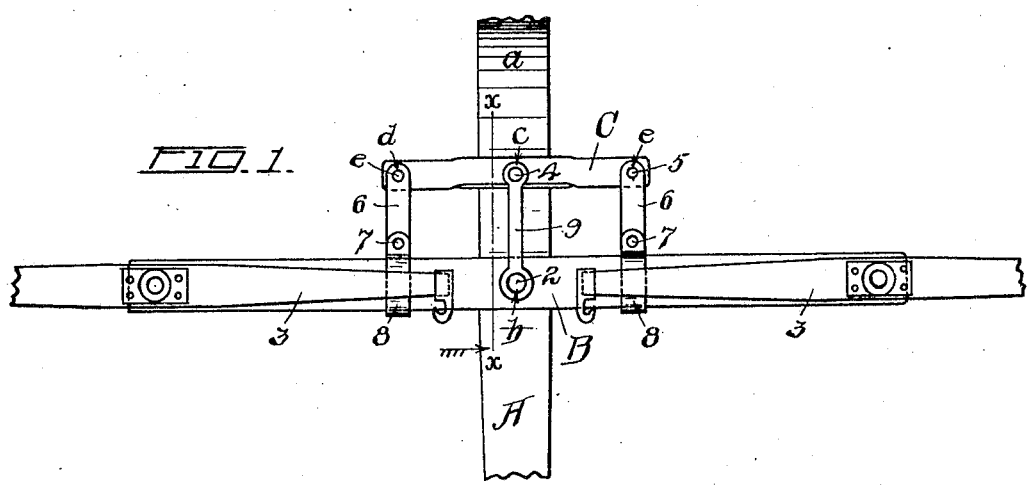
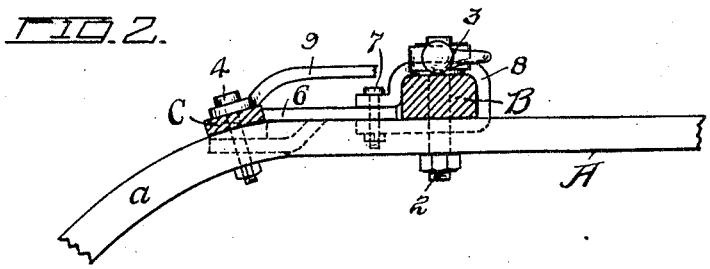
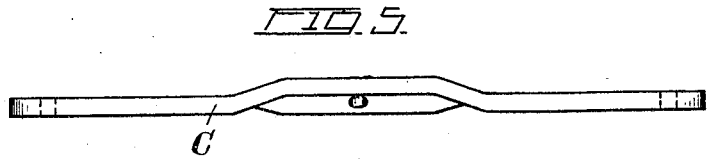

UNITED STATES PATENT OFFICE.

JAMES F. BUTTERFIELD, OF STUART, NEBRASKA.

ATTACHMENT FOR DOUBLETREES.

No. 851,648.

Specification of Letters Patent.

Patented April 30, 1907.

Application filed April 26, 1906. Serial No. 313,824.

*To all whom it may concern:*

Be it known that I, JAMES F. BUTTERFIELD, a citizen of the United States, residing at Stuart, in the county of Holt and State of Nebraska, have invented certain new and useful Improvements in Attachments for Doubletrees, of which the following is a specification.

This invention relates to a double tree attachment for carriages, wagon and other vehicles and other devices of that kind, provided with whiffle-trees arranged for hitching two draft-animals abreast.

The object of the invention is to provide an attachment for double-trees, which will be inexpensive in manufacture, strong and durable, and constructed of the minimum number of parts which not only evens the draft of the animals but prevents the breaking of double trees near the center which has heretofore been the great trouble with light double trees used on bad roads.

For a full description of the invention and the merits thereof, reference is to be had to the following description and accompanying drawings, in which:—

Figure 1, is a plan view of a portion of a tongue provided with a double tree strengthening attachment embodying my invention. Fig. 2, is a horizontal section thereof in line X—X of Fig. 1, looking in direction of the arrow. Fig. 3, is a side elevation of a clevis employed in my invention. Fig. 4, is a side elevation of a spring double tree clamp. Fig. 5, is a front edge view of a strengthening bar or strap designed to be used on carriages or other vehicles provided with a tongue having one curved end, while Fig. 6, is an end view thereof.

Like letters of reference refer to like parts throughout the specifications and drawings.

Heretofore owners of carriages and other vehicles, provided with whiffle-trees arranged for hitching two draft-animals abreast, have been greatly troubled with the double trees breaking near the center, especially those used on carriages or the like, which are generally made very light to conform with the style of the carriage.

My invention obviates the difficulty as set forth by the employment of a metal bar or strap pivoted to the tongue in the rear of the double tree and connected by means of clevis and spring double tree clamps to the double tree which is pivoted to the tongue in the usual manner.

A further description of my invention is as follows:—

A, designates the tongue or pole, which is shown in the drawings as a carriage tongue or pole having the curved end $a$.

B, designates the double tree which is pivoted at its center by means of the bolt 2, to the tongue or pole A. The double tree A, is further, near each end, provided with the pivotally held swingle-trees 3, 3, as usual.

Pivotally held at a suitable distance in rear of the double-tree B, at its center by means of the pin 4, is the transverse strengthening bar or strap C, to which is pivotally held at each end by means of the pins 5, the clevises 6, to which, at one end, are pivoted by means of the pins 7, the spring clamps 8, as clearly shown in Figs. 1, and 2. This clevis and clamp is more clearly shown in detail in Figs. 3, and 4.

The double tree B, and strengthening bar or strap C, are further connected by means of the usual connecting link 9.

In the drawings, as above stated, I have shown my attachment in connection with a curved tongue or pole, and when used for this kind of a pole, it will be observed that the center body portion of the bar must be twisted to an angle as shown in Fig. 2, so that the lower surface thereof will lie approximately parallel with the curvature of the tongue as at $a$, and the ends of the bars parallel with the jaws of the clevis 6, as shown in dotted lines in Fig. 2, and in full lines in Fig. 6.

When my attachment is used on wagons or the like, where a straight tongue or pole is employed, the strengthening bar or strap C, does not need to be twisted at an angle to the end of the bar thus obviating twisting of the bar.

The object which my invention is intended for is not for equalizing, but it is particularly adapted to be used as an attachment to double trees to prevent their breaking near their center which has been the great difficulty with double trees heretofore when used on carriages that are driven through all kinds of soil. With my attachment, it can be readily seen that the pull and strain is not on one central point, as heretofore, but as a matter of fact from points marked $b$, $c$, $d$, and $e$, thus providing an attachment which is practical, strong and durable and one which may be employed on any vehicle or the like where the double tree should be strengthened.

Having thus fully described my invention, what I claim as new is:

1. In an attachment for double trees, the combination of a double tree, a strengthening bar or strap lying parallel with said double tree and in the rear thereof, and adapted to be pivoted at its center to the tongue or pole, clevises pivoted near each end of said bar, spring clamps pivoted to said clevises and encircling the double tree which is pivoted in advance to the strengthening bar to the tongue or pole, substantially as set forth.

2. In an attachment for double trees, the combination of a tongue or pole, a double tree pivoted at its center thereto, a transverse strengthening bar laying parallel with said double tree and pivoted at its center to the tongue or pole, clevises connected at each end thereof at one end and at their opposite ends to spring clamps firmly held around the double tree, and a connecting link for connecting the double tree and bar or strap, substantially as set forth.

In testimony whereof I affix my signature in presence of two witnesses.

JAMES F. BUTTERFIELD.

Witnesses:
F. R. STEARNS,
FRED L. BARCLAY.